United States Patent [19]

Tuckey et al.

[11] Patent Number: 5,579,739

[45] Date of Patent: *Dec. 3, 1996

[54] RETURNLESS FUEL SYSTEM WITH DEMAND FUEL PRESSURE REGULATOR

[75] Inventors: Charles H. Tuckey, Cass City; G. Clarke Oberheide, Troy, both of Mich.

[73] Assignee: Walbro Corporation, Cass City, Mich.

[*] Notice: The term of this patent shall not extend beyond the expiration date of Pat. No. 5,458,104.

[21] Appl. No.: 398,215

[22] Filed: Mar. 2, 1995

Related U.S. Application Data

[63] Continuation-in-part of Ser. No. 181,848, Jan. 14, 1994, Pat. No. 5,458,104, and Ser. No. 262,847, Jun. 21, 1994, Pat. No. 5,398,655.

[51] Int. Cl.$^6$ .................................................. F02M 41/00
[52] U.S. Cl. .......................................... 123/467; 123/463
[58] Field of Search .................................. 123/497, 516, 123/467, 447, 456

[56] References Cited

U.S. PATENT DOCUMENTS

| | | | |
|---|---|---|---|
| 4,248,194 | 2/1981 | Drutchas | 123/497 |
| 4,608,957 | 9/1986 | Kemmner | 123/467 |
| 4,697,995 | 10/1987 | Tuckey | 418/15 |
| 4,741,315 | 5/1988 | Fehrenbach | 123/467 |
| 4,800,859 | 1/1989 | Sagisaka | 123/497 |
| 4,825,835 | 5/1989 | Deweerot | 123/467 |
| 4,919,102 | 4/1990 | Iwaduchi | 123/497 |
| 4,926,829 | 5/1990 | Tuckey | 123/497 |
| 5,148,792 | 9/1992 | Tuckey | 123/497 |
| 5,265,644 | 11/1993 | Tuckey | 137/510 |
| 5,337,718 | 8/1994 | Tuckey | 123/497 |
| 5,361,742 | 11/1994 | Briggs | 123/497 |
| 5,406,922 | 4/1995 | Tuckey | 123/497 |
| 5,429,094 | 7/1995 | Akiba | 123/467 |
| 5,458,104 | 10/1995 | Tuckey | 123/467 |

*Primary Examiner*—Carl S. Miller
*Attorney, Agent, or Firm*—Barnes, Kisselle, Raisch, Choate, Whittemore & Hulbert

[57] ABSTRACT

A no-return fuel system for an automotive engine with fuel injectors. The system has an electric fuel pump received in a fuel tank and supplying fuel at a substantially constant pressure to a demand regulator which delivers fuel to the fuel injectors under varying engine operating conditions. The fuel is delivered to the demand regulator at a substantially constant pressure by varying the speed of the fuel pump in response to changing fuel demand of the engine and/or by by-passing some of the fuel supplied by the pump through a by-pass regulator or relief valve. The demand regulator has a housing with a flexible diaphragm between first and second chambers. The admission of fuel to the first chamber is controlled by a valve associated with the diaphragm and fuel from this chamber is supplied to the engine injectors. Under some operating conditions, the valve closes and if the fuel trapped between the valve and the injectors expands, the diaphragm is displaced to accommodate the expansion and accumulate the expanded fuel. If the pressure of the trapped fuel increases sufficiently to a predetermined maximum value, the valve opens to limit its maximum pressure to the predetermined value. In some applications, the second chamber communicates with the engine air intake manifold so that under normal operating conditions, fuel is supplied to the engine injectors with a substantially constant pressure drop across the injectors.

75 Claims, 6 Drawing Sheets

RETURNLESS FUEL SYSTEM WITH DEMAND FUEL PRESSURE REGULATOR

This is a continuation-in-part of U.S. patent applications Ser. Nos. 08/181,848 filed on Jan. 14, 1994 which issued on Oct. 17, 1995 as U.S. Pat. No. 5,458,104 and 08/262,847 filed on Jun. 21, 1994 which issued as U.S. Pat. No. 5,398,655 on Mar. 21, 1995.

FIELD OF THE INVENTION

This invention relates to a vehicle fuel system and more particularly to a fuel system with a pressure demand regulator for an internal combustion engine with fuel injectors.

BACKGROUND OF THE INVENTION

In many engines with fuel injection systems, it is desirable to supply liquid fuel to the injector or injectors at a pressure which varies as a function of the manifold pressure so that the pressure drop across the injectors remains constant. Both the manifold pressure and the flow rate of fuel supplied by the injectors to the engine varies with engine speed, load and other operating conditions. In fuel delivery systems it is desirable to minimize the transient delay in fuel flow due to changing engine fuel demand and to maximize dampening of fuel pulsations caused by the fuel injection events and inertia of the fuel supplied to the injectors.

Previous returnless fuel supply systems have been developed one of which is shown and described in U.S. Pat. No. 5,148,792. This system has a fuel tank with a fuel Dump to supply fuel under pressure through a fuel line to a fuel rail coupled to a fuel injector for supplying fuel to the engine cylinder. The pump includes a pressure sensor which provides an electrical signal as a function of fuel pressure at the pump outlet to an electronic control to vary the speed of the pump to maintain a constant pressure within the fuel line. However, this system cannot maintain a constant pressure differential across the injectors.

Previous systems have been known to include a pressure regulator which has a manifold reference to maintain a constant pressure drop across the injectors. One such regulator is disclosed in U.S. Pat. No. 5,265,644. However, these prior regulators cannot accommodate any increase in pressure caused by fuel expansion due to heat rise and do not accumulate the increased volume of the heated fuel. For example, during engine deceleration the injectors may close trapping fuel in the fuel rail. The high temperature within the fuel rail causes the fuel to be heated and expand which increases the pressure in the fuel rail.

Pressure rise and fuel expansion in the rail also occurs during conditions known as hot soak. Hot soak conditions occur when the engine has been idling or running at slow speeds especially during hot weather or when the hot engine is turned off. The high temperature in the fuel rail plus the hot ambient air causes the fuel trapped in the fuel rail to be heated and expand. Some pressure increase is desirable to prevent fuel vapor formation. However, excessive pressure in the fuel rail is undesirable since it could force fuel through the injectors causing leakage and/or malfunctions.

In by-pass type regulators, any fuel pressure above the set system pressure is relieved by returning fuel to the tank through a fuel return line. Thus, such devices only maintain a set system pressure. Since these regulators cannot accommodate any pressure higher than the system set pressure fuel vapor is allowed to form when the fuel is heated excessively.

SUMMARY OF THE INVENTION

A no-return fuel system with a demand regulator to limit and regulate a desired pressure in the fuel rail during normal dividing conditions, to act as an accumulator to accommodate fuel expansion due to heating of fuel in the rail and accommodate and maintain increased pressure of heated fuel in the rail to prevent vapor formation therein and, preferably, to respond to the manifold vacuum to maintain a constant pressure differential across the injectors during normal and transient driving speeds.

To limit and regulate pressure in the fuel rail, the demand regulator of the present invention is preferably coupled to the fuel rail at a location close to the manifold. Thus, a manifold reference is easily provided to the demand regulator in order to regulate the pressure in the fuel rail to maintain a constant pressure drop across the fuel injectors.

Preferably, the demand regulator has a diaphragm received between a first liquid fuel chamber continuously communicating with a fuel rail of the engine and preferably a second gas chamber communicating with an engine intake manifold. Liquid fuel is supplied at a substantially constant pressure by a pump to the first chamber through a valve that opens and closes in response to movement of the diaphragm. In normal operation this supplies fuel to the rail at a pressure (such as 50 psig) somewhat lower than the constant pressure (such as 55 psig) of fuel supplied by the pump. When the valve is closed, if the fuel in the rail is heated and expands, the diaphragm is displaced to increase the volume of the first chamber and thereby accommodate expansion of the heated fuel. Preferably, if the fuel in the rail is heated sufficiently to increase its pressure above a maximum desired higher pressure (such as 60 psig) then the valve opens to back bleed fuel to provide pressure relief at the desired maximum pressure.

In another embodiment, the valve is also opened such as by a solenoid during certain hot soak conditions when it would otherwise be closed. The solenoid holds the valve open so that fuel is supplied by the pump (at 55 psig) to the rail to prevent formation of fuel vapor therein.

Preferably, the fuel is supplied at a substantially constant pressure to the demand regulator by a pump driven by an electric motor, the speed of which is varied to maintain a substantially constant output pressure of the pump under varying fuel flow demand. The pump motor speed can be varied by the electronic engine control for the fuel injectors or by separate electronic circuitry responsive to a pressure sensor. If desired, fuel can be supplied at a substantially constant pressure by a pump preferably driven at a constant speed, connected to a fuel by-pass pressure regulator the output of which is substantially constant over a wide range of fuel demand.

Objects, features and advantages of this invention are to provide a no-return fuel system with a fuel pressure demand regulator which reduces the delay in fuel flow due to changing engine demand, has substantially improved responsiveness and accuracy to rapidly changing engine fuel demand, dampens fuel pulsations, reduces variation in the regulated pressure of fuel supplied to the engine, decreases the transmission of injector noise, permits the use of parallel fuel flow paths to the injectors, preferably maintains a constant fuel pressure drop across the injectors in response to varying normal engine operating conditions, accumulates heated expanded fuel in the fuel rail, relieves excessive pressure of the heated expanded fuel, decreases vaporization of heated fuel, decreases engine emissions, and is rugged, durable, maintenance free, of relatively simple design and economical manufacture and assembly, and has a long in service useful life.

BRIEF DESCRIPTION OF THE DRAWINGS

These and other objects, features, and advantages of this invention will be apparent in view of the following detailed description of the best mode, appended claims and accompanying drawings in which:

DETAILED DESCRIPTION

Figures 1, 2, 3, 4:
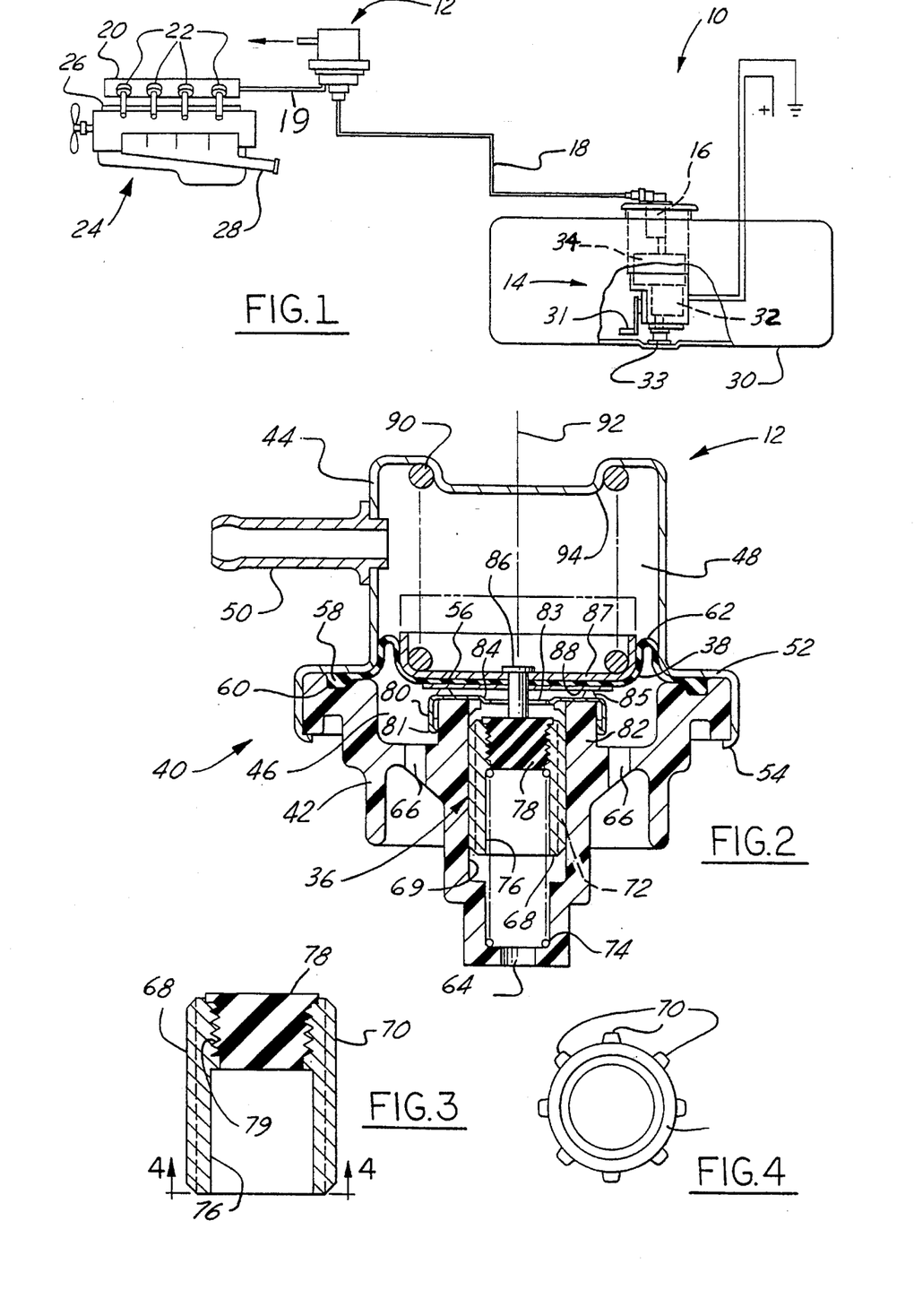
FIG. 1 is a schematic view of a fuel demand pressure regulator embodying this invention in a no-return fuel supply and control system for a fuel injected internal combustion engine.
FIG. 2 is a sectional view of the fuel demand pressure regulator embodying this invention with the valve shown at an open position.
FIG. 3 is an enlarged sectional view of the valve.
FIG. 4 is a bottom view of the valve.

Referring in more detail to the drawings, FIG. 1 illustrates a no-return fuel delivery system 10 incorporating a demand fuel regulator 12 of the present invention for an internal combustion engine. The fuel delivery system has a fuel pump module 14 with a fuel manifold 16 connected through the demand regulator by fuel lines 18 and 19 to a fuel rail 20 and fuel injectors 22 of an internal combustion engine 24 with an air intake manifold 26 and an exhaust manifold 28 for an automotive vehicle, such as an automobile.

In assembly, the pump module 14 is mounted in a fuel tank 30 and has a fuel level sensor 31 and a fuel pump 32 with an inlet communicating with the bottom of the tank through a fuel filter 33 and an outlet communicating with the manifold inlet. The pump is driven by an electric motor 34, the speed of which may be varied to control the pressure of fuel delivered by the pump to the engine through the manifold 16 which produces a regulated constant output pressure in line 18, which is typically about 55 psi. Fuel at a reduced pressure is supplied through the demand regulator 12 to the rail through line 19. The fuel system does not have any fuel return line from the rail or regulator 12 to the fuel tank and is often referred to as a no-return fuel system. A suitable variable speed pump producing a constant output pressure and control circuitry in a no-return fuel system is disclosed in U.S. Pat. No. 5,148,792, the disclosure of which is incorporated herein by reference.

Referring now to FIG. 2, the fuel regulator 12 embodying this invention is illustrated having a valve assembly 36 shown in a full open position and actuated by a diaphragm 38. Both the valve assembly and the diaphragm are received in a housing 40 defined by a body 42 and a cap 44. The diaphragm and housing define a liquid fuel chamber 46 on one side of the diaphragm and a gas chamber 48 on the other side of the diaphragm. The cap has a passage or tube 50 communicating with the gas chamber 48 at one end and connected to the engine manifold at the other end. The cap is secured by a flange 52 with a return bend 54 rolled around the body 42 during assembly of the components.

The diaphragm 38 has a relatively thin and flexible central portion 56 and a circumferentially continuous peripheral rib 58 received in a groove 60 in the body and retained therein by the cap to provide fluid tight seals between them and the diaphragm. Preferably, to provide a more flexible and responsive diaphragm, it has a circumferentially continuous pleat or bellows 62. Preferably, the active portion of the diaphragm has a diameter of about 0.720 inches and is made of a flexible elastomer such as a fluorosilicone rubber or preferably an acronytrile butadiene rubber and may be reinforced with a fabric embedded in the elastomer.

Figure 5:
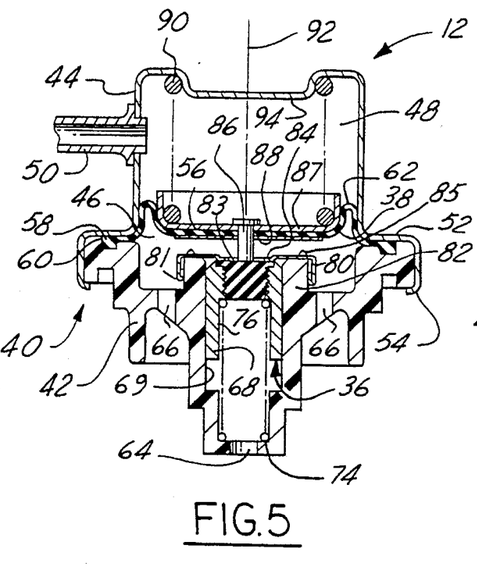
FIG. 5 is a sectional view similar to FIG. 2 showing the valve in a normal closed position.
Figure 6:
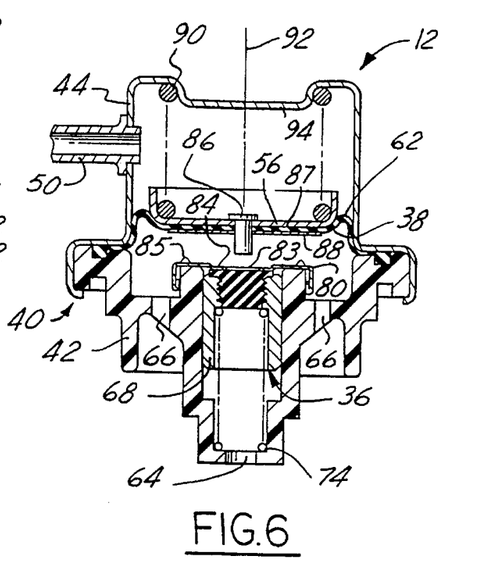
FIG. 6 is a sectional view similar to FIG. 2 showing the demand regulator during heated fuel expansion.

Liquid fuel is admitted to the chamber 46 through an inlet passage 64 in the body and around the valve assembly 36. Fuel is discharged from the chamber 46 through spaced outlet ports 66 to the fuel rail. The valve assembly has a valve body 68 slidably received in a counterbore 69 in the inlet passage. The valve body has a plurality of axially extending and radially projecting ribs 70 forming flow passages 72 with the body 42. The valve is biased by a spring 74 received in a bore 76 in the valve body and acting against the body 42. The end of the valve body is closed by a rubber tip 78 that is preferably injection molded into the valve body. The threads 79 provide a mechanical securement between the rubber tip and the metal valve body. A cap 80 with a rim 81 is received on and sealed to an annular portion 82 of the body and has a central through hole 83 surrounded by an annular valve seat 84. When the valve assembly is closed (FIG. 5), the rubber tip 78 engages the valve seat 84. The cap is press fit or otherwise secured to the body 42 and has a plurality of circumferentially spaced apart dimples 85 which when bearing on the diaphragm permit fuel to flow into chamber 46. Preferably the central hole 83 has a diameter of about 0.18 inches.

The valve is engaged by a valve pin 86 that projects through a central hole in the diaphragm to bear against the rubber tip 78. The valve pin is secured and sealed to the diaphragm by a retainer ring 87 with an upturned edge and a retainer disk 88 on the opposite side of the diaphragm. The diaphragm and the valve pin are yieldably biased toward the valve seat 84 by a compression spring 90 disposed in the chamber 48 and bearing on the retainer ring and cap. The spring is retained generally in coaxial alignment with the longitudinal axis 92 by an annular shoulder 94 in the cap on which it seats and the upturned edge of the retainer ring 87.

If the engine 24 has a V-block with two rows of cylinders, such as a V-6 or V-8, typically it will have a separate fuel rail 20 and fuel injectors 22 for each row or bank of cylinders. Fuel can be supplied to both of the rails, either in parallel or in series, from a single demand regulator 12 or, if desired, in parallel, through two separate regulators 12, one for each fuel rail. Preferably, although not necessarily, the demand regulator 12 is mounted on one of the rails 20, or, if there are two demand regulators, one is mounted on each of the rails to supply fuel thereto. Preferably, although not necessarily, if the fuel rail 20 communicates with two or more spaced apart fuel injectors 22, the demand regulator 12 is mounted on the fuel rail so that its fuel outlet 66 is generally centered between the injectors to provide relatively short and substantially equal fuel flow paths to the injectors. Preferably, although not necessarily, if the engine has two fuel rails each with two or more spaced apart injectors, the outlet of a single demand regulator may be centered between the rails and between the injectors of each rail to provide relatively short and substantially equal fuel flow paths to the injectors.

In use, the demand regulator 12 maintains, varies and limits the pressure in the fuel rail to provide a constant pressure drop across the injectors. This is accomplished by applying the manifold pressure to chamber 48 through tube 50 to cause the diaphragm to actuate the valve 36 to vary and limit the pressure of the fuel supplied to the rail. Since chamber 46 is in constant communication with the fuel rail through ports 66, any pressure change in chamber 46 is transmitted thereto.

If the engine is operating under a steady state condition with a constant intake manifold pressure and a constant fuel flow rate to the rail, the opposing forces acting on the valve 36 would be balanced with the valve in an open position as shown in FIG. 2. The net difference of the force produced by spring 90 and opposed by the fuel in the chamber 46 acting on the diaphragm is transmitted to the valve 36 through the pin 86. The opposing forces acting on the valve are the force produced by the bias of spring 74 plus the force produced by the difference between the pressure of the fuel in chamber 46 and the fuel supplied by the pump through inlet 64 acting on the effective areas of the opposed faces of the valve 36. Because normal engine operation usually produces dynamic and varying conditions, not steady state static conditions, the valve usually rapidly opens and closes or hunts to maintain a substantially constant differential pressure across the fuel injectors by varying the absolute pressure of the fuel supplied by the regulator to the fuel rail.

Under certain conditions, such as engine deceleration or hot soak, the valve 36 closes and the fuel trapped in the rail 20 may be heated sufficiently to expand its volume. As the fuel expands, the diaphragm 38 and thus the pin 86 move away from the valve 36 and the pressure of the fuel trapped in the rail and the chamber 46 increases. This both accumulates the expanded fuel and the increased pressure retards and usually prevents the heated fuel from vaporizing. Movement of the diaphragm and hence expansion of the volume of the chamber 46 also decreases the extent to which the pressure increases and helps to prevent excessive pressure buildup. Such excessive pressure would causes the fuel in the rail to be forced through the injectors causing them to malfunction. If, due to heating, the pressure of the expanded fuel becomes excessive, it will cause the valve 36 to be forced open against the bias of the spring 74 to provide pressure relief by back bleeding fuel past the valve and through the passage 64 to thereby limit the maximum pressure buildup of the expanded fuel trapped in the rail and chamber 46. Once the pressure of the trapped fuel in the rail and chamber returns to the maximum value, the valve 36 again closes.

The maximum pressure at which this relief and back bleeding occurs is a function of both forces produced by the spring 74 and the differential in the pressure of the fuel in the chamber 46 and the fuel supplied to the passage 64 acting on the effective areas of the opposed faces of the valve 36. Hence, the maximum pressure at which this relief occurs can be predetermined and designed into the regulator by changing these variables. Usually, this is most easily accomplished by changing the force produced on the valve by the spring 74.

As a typical example, the valve can be designed so that in normal operation the constant pressure differential across the injectors is 50 psig, constant pressure of the fuel supplied to the inlet passage 64 by the pump module 14 is 55 psig and the maximum overpressure in chamber 46 due to heating of trapped fuel at which pressure relief occurs is about 60 psig. Typically, this regulator is used with an engine having a manifold vacuum pressure which varies in the range of about 5 to 25 psia. When, due to changing operating conditions the pressure of the trapped fuel in the rail and chamber 46 drops to 50 psig the valve 36 opens against the force of the spring 74 to supply fuel from the inlet 64 to the rail. One practical embodiment of this regulator which functions with these pressures and operating parameters has a diaphragm 38 with an effective diameter of about 0.72 of an inch, a spring 90 with a force of about 20 pounds and spring rate of about 37 pounds per inch, a central hole through the seat 84 with a diameter of about 0.18 of an inch and a valve 36 with opposed faces each having an effective area of about 0.025 of a square inch.

Figure 7:
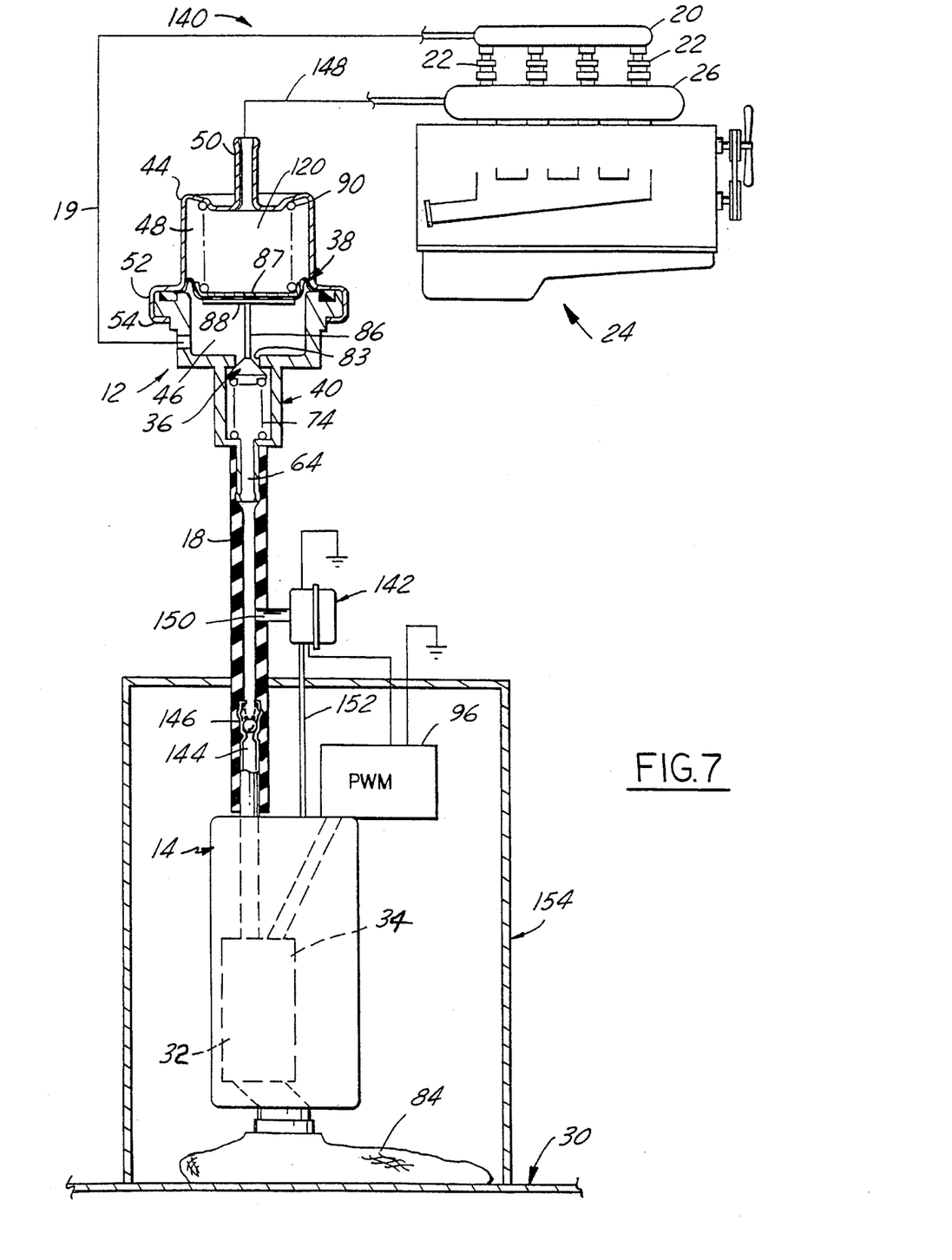
FIG. 7 is a schematic view of a no-return fuel system with the demand regulator of FIG. 1 supplied with fuel by a variable speed fuel pump and by-pass fuel regulator.

FIG. 7 illustrates a no-return vehicle fuel system 140 with the demand regulator 12 which is supplied with fuel at a substantially constant pressure by the fuel module 14 with a by-pass pressure regulator 142. To supply fuel to the demand regulator 12 the outlet 144 of the fuel pump 34 is connected to the inlet 64 of the demand regulator by the fuel line 18 through a check valve 146 preventing back flow of fuel into the pump. To provide a manifold reference the port 50 of the demand regulator is connected by a hose 148 to the manifold 26 of the engine.

For by-passing fuel from the outlet of the pump to maintain constant pressure under varying demand, the inlet 150 of the by-pass regulator 142 is connected to the fuel line 18 downstream of the check valve 146 and upstream of the demand regulator 12 and its outlet 152 returns fuel to a reservoir 154 in the fuel tank 30. Preferably both regulators are connected to the outlet of the fuel pump through a filter 155 (FIG. 8).

In operation, the by-pass regulator 142 controls and regulates the fuel pressure to maintain a substantially constant pressure of the fuel supplied to the demand regulator 12 by by-passing sufficient fuel from the outlet 144 of the pump to maintain a constant inlet pressure to the demand regulator which is higher and usually about 3 to 6 psi higher than the outlet pressure from the demand regulator 12 of the fuel it supplies to the fuel rail 20 and the injectors 22 of the engine.

Figure 8:
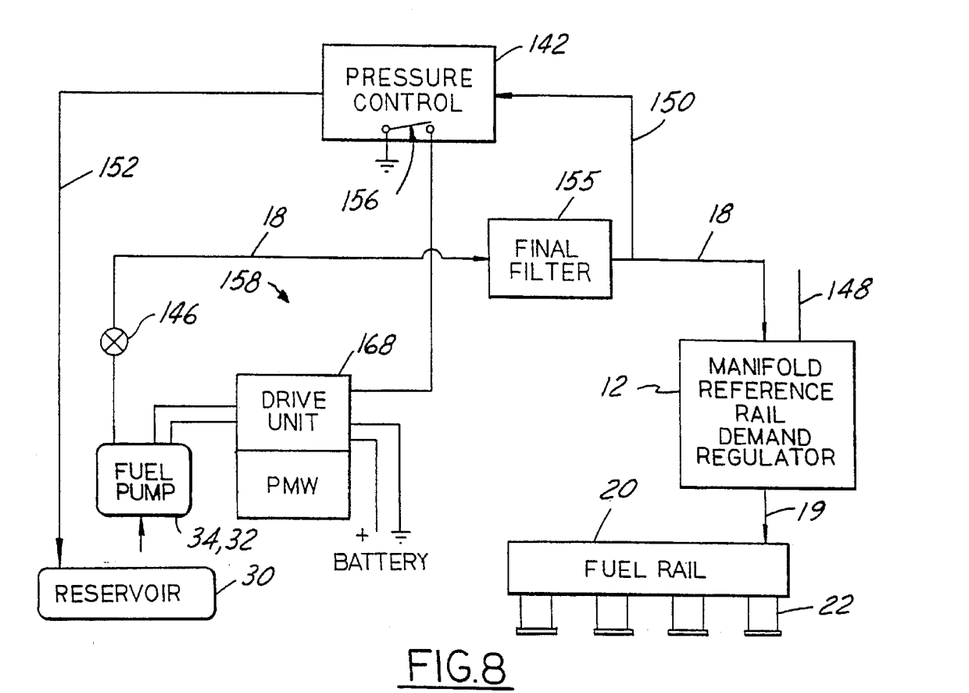
FIG. 8 is a schematic block diagram of the fuel system of FIG. 7.

As shown in FIG. 8, the by-pass regulator 142 includes a pressure sensor switch 156 which is associated with control circuitry 158 having a pulse width modulator and drive circuit 160 which varies the speed at which the electric motor 32 drives the fuel pump 34. The circuitry drives the fuel pump at a speed which is an inverse function of the pump outlet fuel pressure and thus is a direct function of fuel demand by the engine. Suitable pump control circuitry of this nature is disclosed in greater detail in U.S. Pat. No. 4,926,829 issued on May 22, 1990, the disclosure of which is incorporated herein by reference and hence will not be described in further detail In operation of the fuel system 140, when the electric motor 32 is energized the pump 34 supplies fuel to the demand regulator 12 at a substantially constant pressure such as 55 psig. The supply pressure is maintained substantially constant by the by-pass regulator 142 and the pressure responsive switch 156 and associated control circuitry 158 which varies the speed of the pump motor 32 in response to engine fuel demand. Even though engine load, speed and other operating conditions vary, the demand regulator normally supplies fuel to the engine rail 20 and fuel injectors 22 at a substantially constant pressure drop across the injectors 22 at a somewhat lower pressure such as 50 psig. Under certain conditions, such as engine deceleration or hot soak, the valve 36 of the demand regulator closes and as fuel trapped in the rail is heated it expands and is accumulated in the chamber 46 of the demand regulator as previously explained. If the pressure of the accumulated fuel becomes excesive, the valve 36 will be forced open to bleed off some of the accumulated fuel and thereby limit its maximum pressure to a predetermined higher pressure such as 60 psig. This bleed off fuel will be discharged by the by-pass regulator 142 into the reservoir 154 or the tank 30. In this fuel system 140, the demand regulator 142 operates in essentially the same manner as it does in the fuel system 10 and hence its operation will not be further described.

If at this higher pressure, such as 60 psig, the by-pass regulator 142 is susceptible to leakage, malfunctioning or damage by reverse flow of fuel through it, it can be protected by a check valve and a pressure relief valve in series disposed downstream of the by-pass regulator 142 and upstream of the demand regulator 12. The check valve would prevent the by-pass regulator 142 from being subjected to reverse flow from the demand regulator and the relief valve would return to the fuel tank any fuel reverse flowing from the demand regulator at a pressure equal to or greater than the pressure at which the relief valve opens (such as 60 psig). If this check valve and pressure relief valve are used, the check valve 146 can be eliminated.

Figure 9:
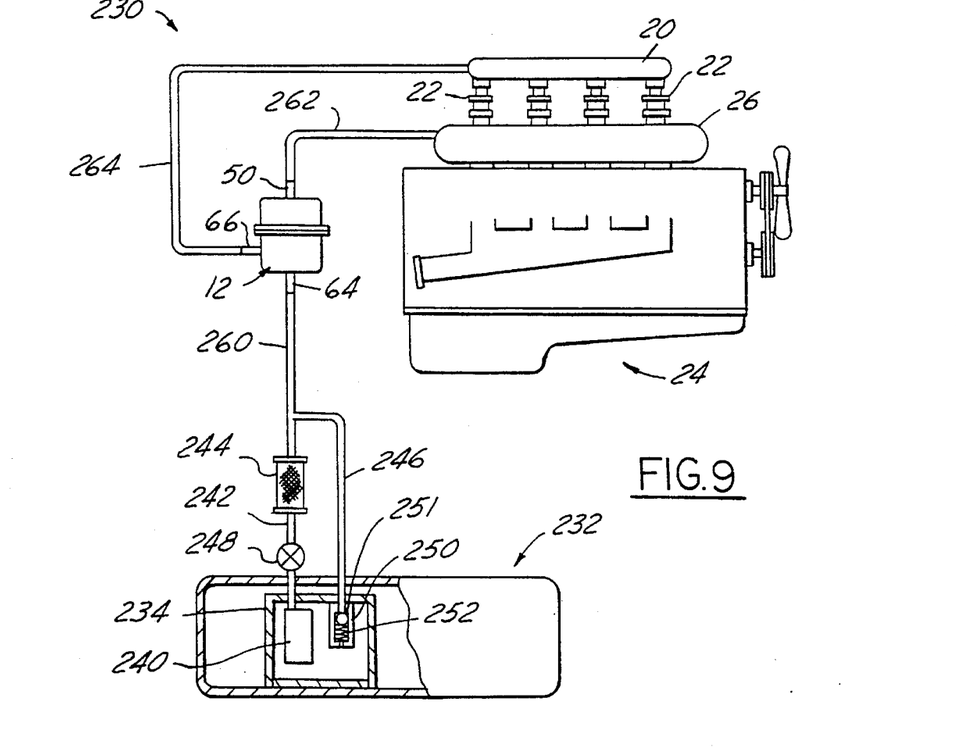
FIG. 9 is a schematic view of another no-return fuel system with the demand fuel regulator of FIG. 1 supplied with fuel by a constant speed pump and a by-pass relief valve fuel regulator.

FIG. 9 illustrates another vehicle no-return fuel system 230 embodying this invention with a demand fuel regulator 12 to which fuel is supplied at a substantially constant pressure by an electric fuel pump 240 with a by-pass pressure relief valve 250. The system has a main fuel tank 232 with a fuel reservoir 234 therein containing the pump 240 with a conventional inlet in the reservoir and an outlet passage 242 connected to a filter 244 through a check valve 248 which permits fuel discharge from the pump outlet and prevents back flow of fuel to the pump. The outlet of the filter is connected to the inlet 64 of the demand regulator 12 by a conduit 260. To control the pressure of fuel supplied to the demand regulator 12, a by-pass passage 246 is connected to the conduit 260 between the pump outlet and the demand regulator inlet 64 and preferably downstream of the filter 244 for returning fuel to the reservoir 234 through a pressure relief valve 250 with a ball valve element 251 urged towards its closed position by a backing spring 252. The force produced by the spring 252 is set so that the valve opens at a pressure (such as 55 psig) which is higher (usually about 3 to 6 psi), than the pressure (such as 50 psig) at which the demand regulator 12 supplies fuel through line 264 to the rail 20 and fuel injectors 22 of the engine 24. Preferably, the demand regulator 12 is positioned adjacent the engine 24 to facilitate connecting its port 50 to the engine air intake manifold 26 by the hose or line 262.

In operation of the system 230, the pump 240 is preferably driven at a substantially constant speed to deliver fuel through the line 242, check valve 248, filter 244 and line 260 to the manifold reference demand regulator 12. To deliver the fuel at a substantially constant pressure, such as 55 psig, a portion of fuel supplied by the pump is by-passed through line 246 and the pressure control relief valve 250 into the reservoir 234 or the tank 232. The demand regulator 12 delivers fuel to the rail 20 and injectors 22 of the engine at a substantially constant pressure drop across the injectors, which is somewhat lower than the supply pressure, such as 50 psig even though the fuel demand or requirement of the engine varies under different load, speed and other operating conditions. During engine deceleration or hot soak conditions, fuel is trapped and, if it expands, accumulates in the demand regulator 12 and if the pressure of the trapped fuel increases excessively or unduly, some of i t will back bleed through the demand regulator, by-pass passage 246, by-pass pressure relief valve 250 and into the reservoir 234 or the fuel tank 232. In use in fuel system 230, the demand regulator will operate in essentially the same manner as in fuel systems 10 and 14 and hence its operation will not be further described.

Figure 10:
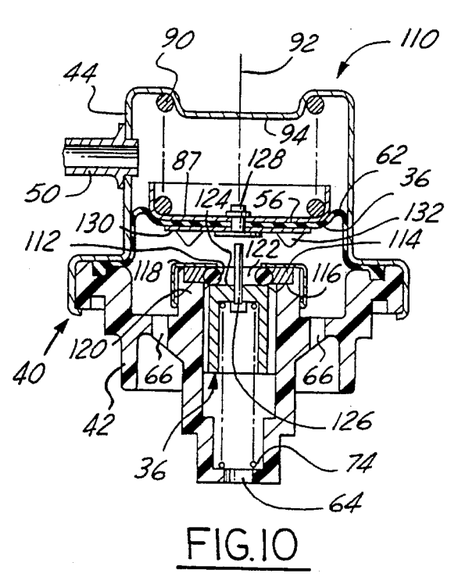
FIG. 10 is a sectional view of a second embodiment of the demand pressure regulator.

FIG. 10 illustrates a modified fuel regulator 110 in which all of the component parts identical to those of the fuel regulator 12 have the same reference numerals. Regulator 110 has a modified valve seat provided by an O-ring 112 received in a carrier disk 114 which is retained in a counterbore 116 by a cad 118 retained on the annular portion 120 of the body and having a central through hole 122. The valve 36' has a modified body with a closed end face 124 which seals against the O-ring when the valve is closed. An actuator pin 126 projects through and is fixed and sealed to the end face of the valve body for engagement by the diaphragm to move the valve. For engaging the pin, a button 128 is secured and sealed to the spring retainer 87, diaphragm 38 and a backup disk 130. The disk 130 has circumferentially spaced and downwardly projecting dimples 132 which when they bear on the retainer cap 118 maintain a gap between them for the flow of fuel into the chamber 46. In use, the regulator 110 operates in essentially the same way as the regulator 12 of FIG. 2 except that the pin 126 is carried by the valve and is independent of the diaphragm 38.

Figure 11:
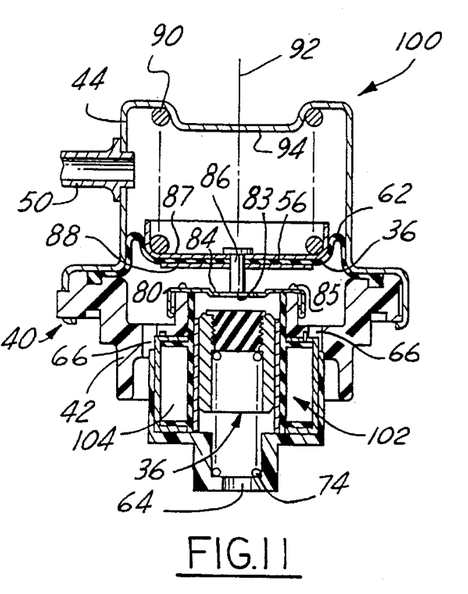
FIG. 11 is a sectional view of a third embodiment of the demand pressure regulator.

Another embodiment of a demand regulator 100 is shown in FIG. 11 which has essentially the same elements and construction as demand regulator 12 plus an electric solenoid 102 to override and open the valve 36 under extreme hot soak conditions when it would otherwise be closed. The body of the valve 36 is made of a ferro magnetic material, such as steel, so that it will be actuated or moved to its open position when a coil 104 of the solenoid is electrically energized.

Figure 12:
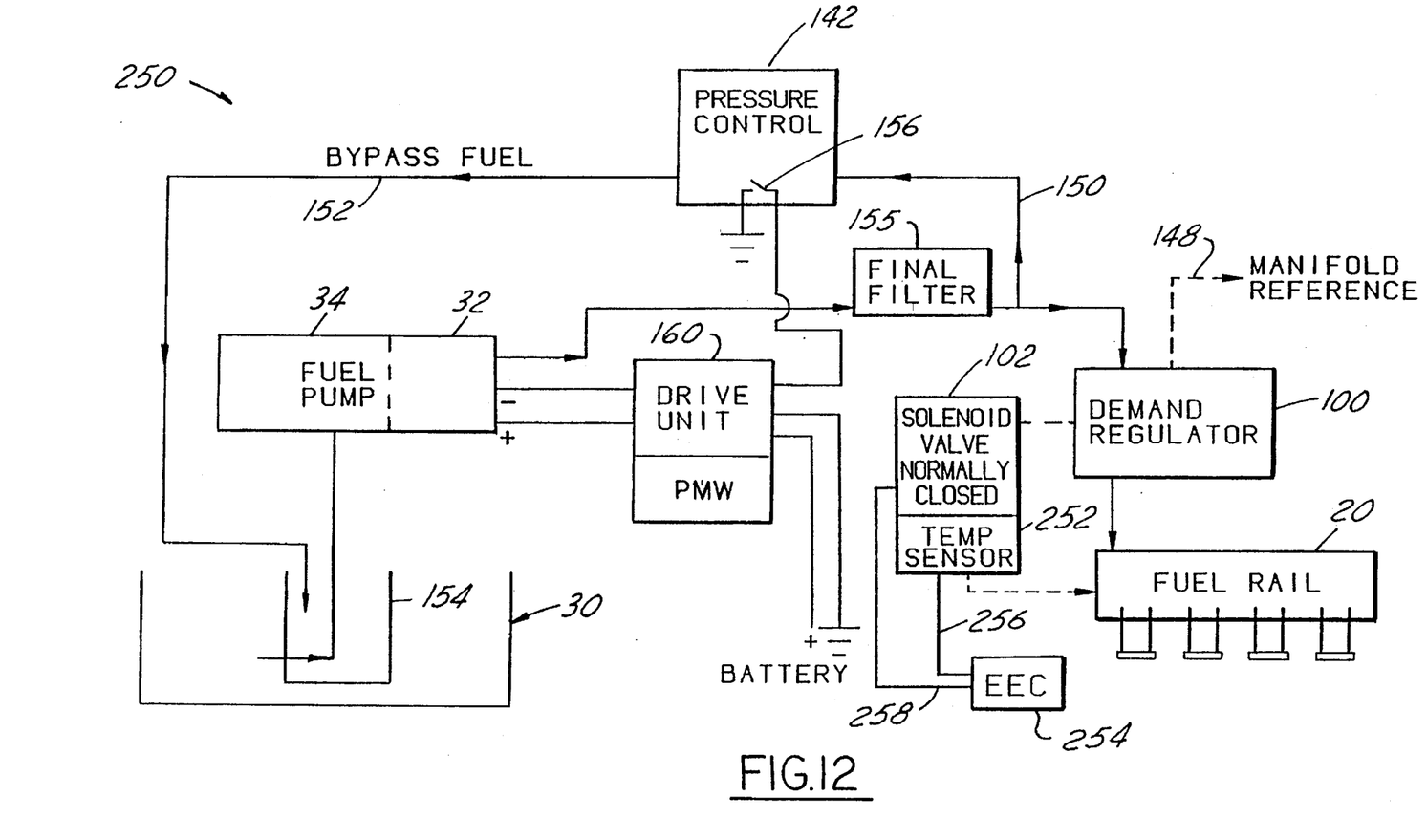
FIG. 12 is a schematic view of another no-return vehicle fuel system with the demand regulator of FIG. 11 supplied by a variable speed fuel pump and by-pass fuel regulator and in hot soak conditions controlled by a temperature sensor.

FIG. 12 illustrates a vehicle no-return fuel system 250 utilizing the demand regulator 100 to prevent vapor formation downstream of the demand regulator under extreme hot soak conditions. Fuel is supplied to the inlet of demand regulator 100 at a substantially constant pressure, such as 55 psig, preferably by a fuel pump 34 with an electric motor 32 driven at a variable speed by electronic circuitry 158 with a pulse width modulated drive unit 160 responsive to a sensor switch 156, and having a by-pass pressure regulator 142. These components are essentially the same as those of the fuel system 140 and hence the description and operation of these components will not be repeated.

In system 250 the solenoid 102 is energized in response to a signal from a temperature sensor 252 preferably on the fuel rail to provide an indication of the temperature of fuel therein which is preferably energized by the engine electronic control circuitry 254 (EEC) when the vehicle ignition is turned on. When the ignition is turned on, if the temperature sensor 252 indicates fuel in the rail is above a predetermined minimum temperature, the engine electronic control circuitry 254 energizes the solenoid valve 102 to open the valve 36 which otherwise would be closed. The EEC 254 is electrically connected to the temperature sensor 252 through an electric wire 256 and the solenoid valve is electrically connected to the EEC through an electric wire 258.

During extreme conditions, the temperature of the trapped fuel in the rail and chamber 46 may rise to 170° F. to 220° F. At this extreme temperature, it is necessary to maintain the pressure of fuel in the rail at a minimum of 55 to 60 psig to prevent vapor formation. When starting an engine under these extreme hot soak conditions, the differential fuel pressure across the injectors would drop to 50 psig before the valve 36 would normally open and this pressure drop would result in some flash vaporization and formation of fuel vapor in the rail which would adversely affect engine operation. In use of the system 250, to avoid this condition, when the temperature rises above 170° F. the temperature sensor 252 produces a signal to activate the solenoid 102 and open the normally closed valve 36 of the demand regulator 100 when the ignition is turned on so that before the engine 24 is cranked and started, the pressure of fuel supplied by the fuel pump 34 to the demand regulator inlet 64 maintains a high enough pressure of the fuel in the rail to prevent vapor formation. The temperature sensor and solenoid overrides the normal regulator operation and maintains the solenoid valve 36 in its open condition until the fuel temperature drops below 170° F. whereupon the solenoid is deactivated so that the regulator returns to its normal operating condition as previously described in connection with the regulator 12.

Figure 13:
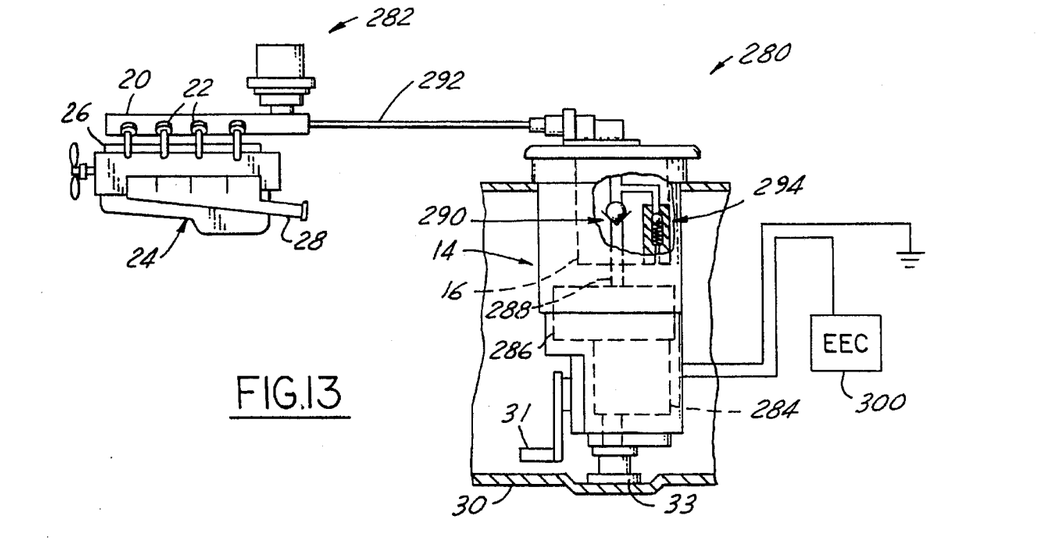
FIG. 13 is a schematic view of another no-return fuel system with a demand fuel regulator supplied with fuel by a centrifugal pump driven at a constant speed.

FIG. 13 illustrates a no-return vehicle fuel system 280 with a modified demand regulator 282 mounted on a fuel rail 20 and supplied with fuel at a substantially constant pressure by a fuel module 14 having a centrifugal fuel pump 284 driven at a constant speed by an electric motor 286. When driven at a constant speed, the centrifugal pump 284 has a substantially constant output pressure over a broad range of fuel flow rates. Fuel is supplied from the outlet 288 of the pump to the inlet 64 of the demand regulator through a one-way check valve 290 preventing reverse flow to the pump and a fuel line 292.

Figures 14, 15:
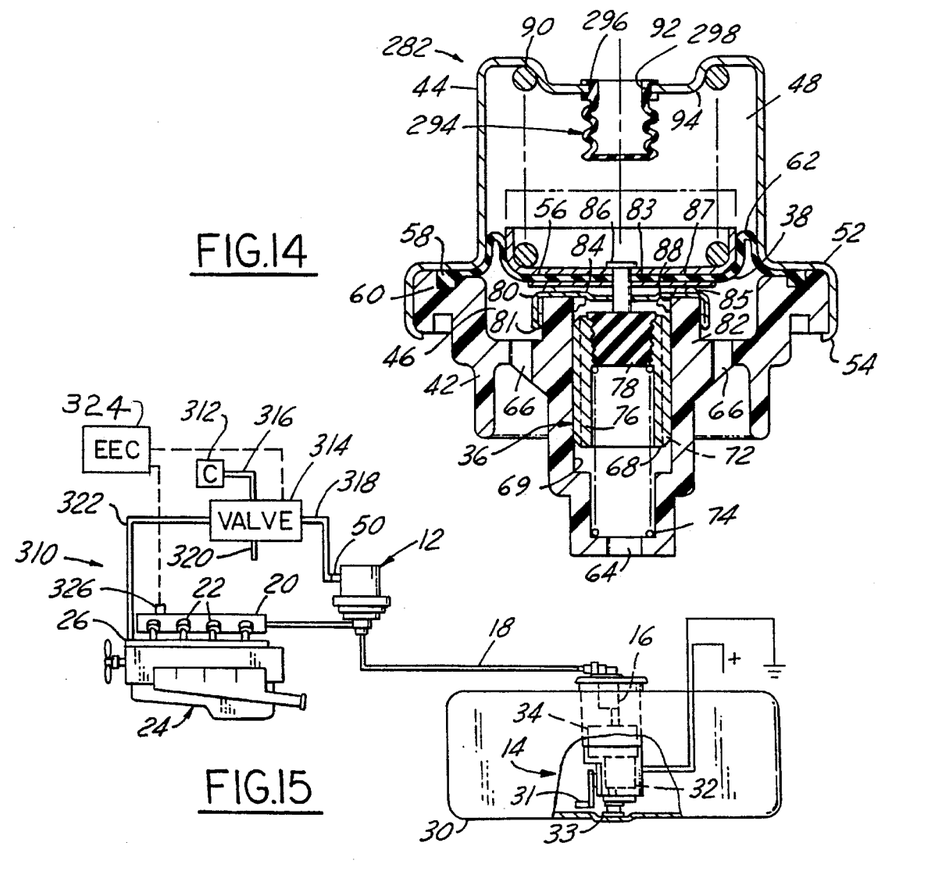
FIG. 14 is a sectional view of the demand fuel regulator of FIG. 13.
FIG. 15 is a schematic view of another no-return fuel system with a demand regulator referenced under varying operating conditions to manifold, atmospheric or superatmospheric pressure.

As shown in FIG. 14, the modified demand regulator 282 is not manifold referenced and its fluid chamber 48 could communicate directly with the exterior atmosphere through an opening in the cap 44. However, preferably, it has a closed and sealed gas chamber 48 which, in the event, the diaphragm 38 leaks, ruptures or fails, prevents liquid fuel from escaping to the atmosphere or exterior of the demand regulator. To prevent changes in temperature of the gas or fluid such as air within the chamber 48 from affecting or changing the fuel output pressure of the demand regulator, any expansion or contraction of the gas within the chamber 48 is accommodated by a highly flexible membrane or bellows 294 disposed in the chamber and having an annular rim 296 received in a hole 298 through the cap and sealed thereto. Since the highly flexible bellows 294 communicates on one side with the chamber 48 and on the other side with the exterior atmosphere, it accommodates any expansion and contraction of the gas within the chamber due to change in its temperature. If no temperature compensation is desired, the chamber 48 can simply be closed and sealed with an imperorate rigid cap 48 but this will produce about a 4 psi increase in the demand regulator outlet fuel pressure as the temperature increases from about −40° F. to more than 200° F. as the engine fuel system and vehicle operates under varying temperature conditions. Since the electric motor 286 and hence the pump 284 is driven at a constant speed, it can be powered by a current at a constant voltage which can be supplied and controlled by an electronic engine control (EEC) module 300 or directly by the vehicle electrical system. The remaining components of the demand regulator 282 are the same as those of the fuel regulator 12 which have the same reference numerals and hence the description of these components will not be repeated.

In operation of the system 280, the centrifugal pump 284 is driven at a substantially constant speed by the electric motor 286 to deliver fuel at a substantially constant pressure to the inlet 64 of the demand regulator 282 through the check valve 290 and the fuel line 292. The actual pressure at which the pump delivers fuel can be changed by changing the speed at which the pump is driven. If fuel is delivered to the demand regulator 282 at a constant pressure, such as 55 psig, the demand regulator will deliver fuel to the rail 20 and the injectors 22 of the engine 24 at a somewhat lower pressure, such as 50 psig, even though the fuel demand or requirement of the engines varies under different load, speed and other operating conditions. If the engine were operating under a steady state condition with a constant fuel flow rate to the rail, the opposing forces acting on the valve 36 would be balanced with the valve in an open position as shown in FIG. 14. However, because normal engine operation usually produces dynamic and varying conditions, not steady state static conditions, the valve 36 usually rapidly opens and closes or hunts to maintain a substantially constant pressure, such as 50 psig, of fuel supplied to the rail and hence the injectors.

Under certain conditions, such as engine deceleration or hot soak, valve 36 of the demand regulator 282 closes and as fuel trapped in the rail is heated, it expands and is accumulated in the chamber 46 of the demand regulator as previously explained. If the pressure of the accumulated fuel becomes excessive, valve 36 will be forced open to bleed off some of the accumulated fuel and thereby limit its maximum pressure to a predetermined higher pressure, such as 60 psig. This bleed off fuel will be discharged into the module 14 or tank 30, through a pressure relief valve 294 which is connected to the demand regulator supply line 292 between the check valve 290 and the demand regulator.

FIG. 15 illustrates a modified no-return vehicle fuel system 310 in which the fluid chamber 48 of the demand regulator 12 can be subjected to atmospheric or superatmospheric pressure, in lieu of manifold pressure, under at least some engine operating conditions. For example, under hot soak conditions, it may be desirable to apply atmospheric or superatmospheric pressure to the chamber 48 to thereby increase the pressure of fuel supplied to the injectors during startup of the engine and running of the engine (to reduce or avoid vaporization of fuel) until the temperature of the fuel in the fuel rail 20 drops to a normal operating temperature which is usually less than about 170° F. Under some engine operating conditions, such as full load or maximum acceleration conditions, it may be desirable to apply atmospheric or superatmospheric pressure to the chamber 48 to increase the fuel pressure and hence the dynamic or operating range and the maximum quantity of fuel the fuel injectors can supply to the engine.

As shown in FIG. 15, air under superatmospheric pressure can be produced by a compressor 312 and supplied through a solenoid control valve 314 to the inlet port 50 to the fluid chamber 48 of the demand regulator 12. The outlet of the compressor is connected to a first inlet port of the valve 314 by a supply line 316 and the outlet port of the valve is connected to the port 50 of the demand regulator by the line 318. For supplying air at atmospheric pressure to the demand regulator 127, a second inlet port of the valve communicates with the exterior atmosphere through the inlet line 320. For supplying a manifold pressure or reference to the port 50 of the demand regulator, a third inlet of the valve 314 is connected to the engine air intake manifold 26 by the line 322.

Preferably, the solenoid valve 314 is actuated and controlled by an electronic engine control (EEC) module 324 which also typically calculates and determines the quantity of fuel to be supplied to the engine 24 under various operating conditions and actuates and controls the injectors 22 of the engine to do so. To provide to the EEC module 324 a signal indicative of the temperature of the fuel supplied to the injectors, a suitable temperature sensor 326 may be mounted on the fuel rail 26 and electrically connected to the EEC module. Since the EEC module calculates and determines the quantity of fuel to be delivered to the engine, it can also drive, vary and control the speed of the electric motor 34 to vary and control the speed of the pump 32 to maintain a substantially constant pressure, such as 55 psi, of the fuel supplied from the outlet of the pump to the inlet 64 of the demand regulator 12. The EEC module can drive the pump motor 34 through an open loop system in which it varies the voltage of the current supplied to the electric motor to vary and change the speed of the pump without the need for a pressure sensor control responsive to the pump outlet pressure, such as is used in the closed loop system 140 of FIGS. 7 and 8 and system 250 of FIG. 12.

In use, in all of these systems, the demand regulator also dampens the fuel pressure fluctuations produced by operation of the fuel injectors and substantially isolates the fuel supply line and all fuel system components upstream of the demand regulator from these pressure fluctuations and the transmission of noise produced by these fluctuations due to the operation of the fuel injectors. In use, the output pressure of the demand regulator is controlled by actuation of the valve assembly in response to a first range of movement of the diaphragm to open and close the valve assembly, when the valve assembly closes if the trapped fuel expands it is accumulated through a second range of movement of the diaphragm independently of the valve assembly, and if the expansion of the trapped fuel produces an excessive pressure it directly opens the valve assembly to bleed off some of the trapped fuel and to limit the maximum pressure of the remaining accumulated fuel.

What is claimed is:

1. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for continuously communicating with the injector to supply fuel to the injector, a demand regulator inlet carried by the housing for supplying fuel to the expansible chamber, an electric fuel pump having a pump inlet for communicating with a supply of fuel and a pump outlet for communicating with the regulator inlet to supply fuel thereto at a substantially constant pressure under normal operating conditions, a valve between the regulator inlet and the expansible chamber and operably associated with the diaphragm to move to open and closed positions to control the flow of all fuel from the demand regulator inlet through the expansible chamber, and supplying all the fuel from the expansible chamber to the fuel injector in response to the demand of the engine for fuel under normal operating conditions, and when the valve closes and the volume of fuel trapped between the injector and the valve expands, the diaphragm moves relative to the housing to increase the volume of the expansible chamber to thereby accommodate expansion of the trapped fuel.

2. A fuel system as defined in claim 1 which also comprises a pressure sensor disposed between the outlet of the pump and the valve of the demand regulator and responsive to variations in fuel pressure, and electronic drive circuitry operably connected with the pressure sensor and the electric motor of the fuel pump to vary and control the operating speed of the electric motor and hence the fuel pump to supply fuel at a substantially constant pressure to the demand regulator inlet.

3. A fuel system as defined in claim 2 wherein the electronic drive has pulse width modulator circuitry to vary and control the speed of the electric motor driving the fuel pump.

4. A fuel system as defined in claim 2 which also comprises a by-pass regulator having a fuel inlet connected with the outlet of the fuel pump upstream of the valve of the demand regulator and an outlet for returning by-passed fuel to the fuel supply and being constructed to by-pass at least a portion of the fuel from the pump outlet to maintain the fuel supplied to the regulator inlet at a substantially constant pressure.

5. A fuel system as defined in claim 4 wherein said pressure sensor comprises a pressure responsive switch associated with said by-pass regulator and electrically connected with said electronic drive circuitry.

6. A fuel system as defined in claim 1 which also comprises a by-pass regulator having a fuel inlet connected with the outlet of the fuel pump upstream of the valve of the demand regulator and an outlet for returning by-passed fuel to the fuel supply and being constructed to by-pass at least a portion of the fuel from the pump outlet to maintain the fuel supplied to the demand regulator inlet at a substantially constant pressure.

7. A fuel system as defined in claim 1 which also comprises a by-pass regulator having a fuel inlet connected with the outlet of the fuel pump upstream of the valve of the demand regulator and an outlet for returning by-passed fuel to the fuel supply and being constructed to by-pass at least a portion of the fuel from the pump outlet to maintain the fuel supplied to the demand regulator inlet at a substantially constant pressure, and in normal operation the fuel pump is driven by the electric motor to operate at a substantially constant speed.

8. A fuel system as defined in claim 1 which also comprises a pressure relief valve having an inlet communicating with the pump outlet upstream of the valve of the demand regulator and an outlet for returning by-passed fuel to the fuel supply and the relief valve being constructed to by-pass fuel from the pump outlet to maintain the fuel supplied to the demand regulator inlet at a substantially constant pressure, and in normal operation the fuel pump is driven by the electric motor to operate at a substantially constant speed.

9. A fuel system as defined in claim 1 which also comprises a one-way valve between the pump outlet and the valve of the demand regulator which permits the flow of fuel from the pump to the demand regulator inlet and closes to prevent reverse flow of fuel from the demand regulator through the fuel pump.

10. A fuel system as defined in claim 2 which also comprises a one-way valve between the pump outlet and the valve of the demand regulator which permits the flow of fuel from the pump to the demand regulator inlet and closes to prevent reverse flow of fuel from the demand regulator through the fuel pump.

11. A fuel system as defined in claim 6 which also comprises a one-way valve between the by-pass regulator and the valve of the demand regulator which permits the flow of fuel from the pump to the demand regulator inlet and closes to prevent reverse flow of fuel from the demand regulator through the fuel pump.

12. A fuel system as defined in claim 8 which also comprises a one-way valve between the pump outlet and the valve of the demand regulator which permits the flow of fuel from the pump to the demand regulator inlet and closes to prevent reverse flow of fuel from the demand regulator through the fuel pump.

13. A fuel system as defined in claim 1 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

14. A fuel system as defined in claim 2 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

15. A fuel system as defined in claim 4 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

16. A fuel system as defined in claim 6 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

17. A fuel system as defined in claim 8 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

18. A no-return fuel system for a combustion engine with an air intake manifold and at least one fuel injector, comprising a demand regulator having a housing, a diaphragm defining in cooperation with said housing an expansible first chamber and a second chamber, said diaphragm having generally opposed faces with one of the faces communicating with only the first chamber and the other face communicating with only the second chamber, the second chamber having a passage communicating with the air intake manifold of the engine, a fuel outlet from said first chamber for communicating with the injector of the engine to supply fuel to the injector, a fuel inlet carried by the housing for supplying fuel to the first chamber, an electric fuel pump having a pump inlet for communicating with a supply of fuel and a pump outlet for communicating with the demand regulator inlet to supply fuel thereto at a substantially constant pressure under normal operating conditions, said diaphragm being yieldably biased relative to the housing in a direction tending to decrease the volume of the expansible first chamber, a valve carried by the body and communicating between the demand regulator inlet and the first chamber and operably associated with the diaphragm to move the valve to open and closed positions to control the flow of fuel from the demand regulator inlet into the first chamber to produce a substantially constant pressure drop across the injector under normal operating conditions, and when the valve closes and fuel trapped between the injector and the valve expands, the diaphragm moves relative to the housing to increase the volume of the first chamber to thereby accommodate expansion of the trapped fuel.

19. A fuel system as defined in claim 18 which also comprises a pressure sensor disposed between the outlet of the pump and the valve and responsive to variations in fuel pressure, and electronic drive circuitry operably connected with the pressure sensor and the electric motor of the fuel pump to vary and control the operating speed of the electric motor and hence the fuel pump to supply fuel at a substantially constant pressure to the demand regulator inlet.

20. A fuel system as defined in claim 19 wherein the electronic drive has pulse width modulator circuitry to vary and control the speed of the electric motor driving the fuel pump.

21. A fuel system as defined in claim 18 which also comprises a by-pass regulator having a fuel inlet connected with the pump outlet upstream of the valve of the demand regulator and an outlet for returning fuel by-passed to the fuel supply and being constructed to by-pass at least a portion of the fuel from the pump outlet to maintain the fuel supplied to the demand regulator inlet at a substantially constant pressure.

22. A fuel system as defined in claim 18 which also comprises a by-pass regulator having a fuel inlet connected with the pump outlet upstream of the valve of the demand regulator and an outlet for returning by-passed fuel to the fuel supply and being constructed to by-pass at least a portion of the fuel from the pump outlet to maintain the fuel supplied to the demand regulator inlet at a substantially constant pressure, and in normal operation the electric motor drives the fuel pump to operate at a substantially constant speed.

23. A fuel system as defined in claim 18 which also comprises a pressure relief valve having an inlet communicating with the pump outlet upstream of the valve of the demand regulator and an outlet for returning by-passed fuel to the fuel supply, and the relief valve being constructed to by-pass at least a portion of the fuel from the pump outlet to maintain the fuel supplied to the demand regulator inlet at a substantially constant pressure, and in normal operation the electric motor drives the fuel pump to operate at a substantially constant speed.

24. A fuel system as defined in claim 18 which also comprises a one-way valve between the pump outlet and the valve of the demand regulator which permits the flow of fuel from the pump outlet to the demand regulator inlet and closes to prevent reverse flow of fuel from the demand regulator through the fuel pump.

25. A fuel system as defined in claim 19 which also comprises a one-way valve between the pump outlet and the valve of the demand regulator which permits the flow of fuel from the pump outlet to the demand regulator inlet and closes to prevent reverse flow of fuel from the demand regulator through the fuel pump.

26. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel from the expansible chamber to the injector(s), a demand regulator inlet carried by the housing for supplying all fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve communicating between the demand regulator inlet and the expansible chamber and operably associated with the diaphragm to move to open and closed positions to control the flow of all fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel.

27. A fuel system as defined in claim 26 which also comprises a pressure sensor disposed between the outlet of the pump and the valve of the demand regulator and responsive to variations in fuel pressure, and electronic drive circuitry operably connected with the pressure sensor and the electric motor of the fuel pump to vary and control the operating speed of the electric motor and hence the fuel pump to supply fuel at a substantially constant pressure to the demand regulator inlet.

28. A fuel system as defined in claim 27 wherein the electronic drive has pulse width modulator circuitry to vary and control the speed of the electric motor driving the fuel pump.

29. A fuel system as defined in claim 26 which also comprises a by-pass regulator having a fuel inlet connected with the outlet of the fuel pump upstream of the valve of the demand regulator and an outlet for returning by-passed fuel to the fuel supply and being constructed to by-pass at least a portion of the fuel from the pump outlet to maintain the fuel supplied to the demand regulator inlet at a substantially constant pressure.

30. A fuel system as defined in claim 26 which also comprises a by-pass regulator having a fuel inlet connected with the outlet of the fuel pump upstream of the valve of the demand regulator and an outlet for returning by-passed fuel to the fuel supply and being constructed to by-pass at least a portion of the fuel from the pump outlet to maintain the fuel supplied to the demand regulator inlet at a substantially constant pressure, and in normal operation the fuel pump is driven by the electric motor to operate at a substantially constant speed.

31. A fuel system as defined in claim 26 which also comprises a pressure relief valve having an inlet communicating with the pump outlet upstream of the valve of the demand regulator and an outlet for returning by-passed fuel to the fuel supply and the relief valve being constructed to by-pass fuel from the pump outlet to maintain the fuel supplied to the demand regulator inlet at a substantially constant pressure, and in normal operation the fuel pump is driven by the electric motor to operate at a substantially constant speed.

32. A fuel system as defined in claim 26 which also comprises a one-way valve between the pump outlet and the valve of the demand regulator which permits the flow of fuel from the pump to the demand regulator inlet and closes to prevent reverse flow of fuel from the demand regulator through the fuel pump.

33. A fuel system as defined in claim 26 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

34. A fuel system as defined in claim 29 wherein only one side of the diaphragm communicates with the fuel expansible chamber and the demand regulator also comprises a fluid chamber in communication with the other side of the diaphragm and having a port communicating with the air intake manifold so that in normal operation of the engine, the demand regulator also maintains a substantially constant pressure drop across the injectors under varying operating conditions of the engine.

35. A fuel system as defined in claim 26 which also comprises at least one fuel rail communicating with a plurality of fuel injectors, said fuel outlet of said demand regulator communicating with said fuel rail to supply fuel to said plurality of fuel injectors, and said demand regulator being carried by said fuel rail.

36. A fuel system as defined in claim 26 which also comprises a first fuel rail communicating with at least two first fuel injectors, a second fuel rail communicating with at least two second fuel injectors, the fuel outlet of said demand regulator communicating with said first fuel rail and said second fuel rail for supplying fuel to said first fuel injectors and said second fuel injectors, and said demand regulator being carried by one of said fuel rails.

37. A fuel system as defined in claim 26 which also comprises a first fuel rail communicating with at least two first fuel injectors, a second fuel rail communicating with at least two second fuel injectors, a first one of said demand regulators carried by said first fuel rail and having a first fuel outlet communicating with said first fuel rail for supplying fuel to said first fuel injectors and a second one of said demand regulators carried by said second fuel rail and having a second fuel outlet communicating with said second fuel rail to supply fuel to said second fuel injectors.

38. A fuel system as defined in claim 26 which also comprises a fuel rail communicating with a first fuel injector and a second fuel injector spaced from said first fuel injector, said fuel outlet of said demand regulator communicating with said fuel rail between said first and second fuel injectors to supply fuel to both of said first and and second fuel injectors, and said demand regulator being carried by said fuel rail.

39. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel to the injector(s), a demand regulator inlet carried by the housing for supplying fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve communicating between the demand regulator inlet and the expansible chamber and operably associated with the diaphragm to move to open and closed positions to control the flow of fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel, and an actuator operably associated with said valve of said demand regulator for opening said valve when it would otherwise be closed when the temperature of fuel supplied to the injector is greater than a preselected temperature.

40. A fuel system as defined in claim 39 in which said actuator comprises an electric solenoid carried by said demand regulator and operably associated with said valve of said demand regulator.

41. A fuel system as defined in claim 40 which comprises a temperature sensor which produces an electric signal indicative of the temperature of fuel supplied to the injector, electronic control circuitry operably associated with said temperature sensor and said solenoid actuator for energizing said solenoid actuator to open said valve of said demand regulator when the temperature of fuel supplied to the injector is greater than said preselected temperature.

42. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel to the injector(s), a demand regulator inlet carried by the housing for supplying fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve communicating between the demand regulator inlet and the expansible chamber and operably associated with the diaphragm to move to open and closed positions to control the flow of fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel, and a temperature sensor which senses the temperature of fuel supplied to the injector and an actuator operably associated with said valve of said demand regulator for opening said valve when it would otherwise be closed and responsive to said temperature sensor to open said valve of said demand regulator when the temperature of fuel supplied to the injector is greater than a preselected temperature.

43. A no-return fuel system for a combustion engine with an air intake manifold and at least one fuel injector comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel to the injector(s), a demand regulator inlet carried by the housing for supplying fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve communicating between the demand regulator inlet and the expansible chamber and operably associated with the diaphragm to move to open and closed positions to control the flow of fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel, and a temperature responsive actuator operably associated with said valve of said demand regulator for holding open said valve when it would otherwise be closed when the temperature of fuel supplied to the injector is greater than a preselected temperature.

44. A fuel system as defined in claim 1 which also comprises a temperature responsive actuator operably associated with said valve of said demand regulator for holding open said valve when it would otherwise be closed when the temperature of fuel supplied to the injector is greater than a preselected temperature.

45. A fuel system as defined in claim 26 which also comprises a pressure relief valve having an inlet communicating with the pump outlet upstream of the valve of the demand regulator and an outlet for returning by-passed fuel to the fuel supply and the relief valve being constructed to by-pass fuel from the pump outlet to maintain the fuel supplied to the demand regulator inlet at a substantially constant pressure.

46. A fuel system as defined in claim 1 which also comprises a pressure relief valve having an inlet communicating with the pump outlet upstream of the valve of the demand regulator and an outlet for returning by-passed fuel to the fuel supply and the relief valve being constructed to by-pass fuel from the pump outlet to maintain the fuel supplied to the demand regulator inlet at a substantially constant pressure.

47. A fuel system as defined in claim 22 which also comprises a one-way valve between the pump outlet and the valve of the demand regulator which permits the flow of fuel from the pump outlet to the demand regulator inlet and closes to prevent reverse flow of fuel from the demand regulator through the fuel pump.

48. A fuel system as defined in claim 23 which also comprises a one-way valve between the pump outlet and the valve of the demand regulator which permits the flow of fuel from the pump outlet to the demand regulator inlet and closes to prevent reverse flow of fuel from the demand regulator through the fuel pump.

49. A fuel system as defined in claim 26 which also comprises a source of fluid under superatmospheric pressure, and wherein only one side of the diaphragm communicates with the fuel expansible chamber, and the demand regulator also comprises a fluid chamber in communication with the other side of the diaphragm and having a port which can communicate with the source of superatmospheric pressure so that in operation of the engine the pressure at the injectors can be varied by applying superatmospheric pressure to said fluid chamber.

50. A fuel system as defined in claim 26 which also comprises an electronic engine control which determines the quantity of fuel to be supplied to the engine under varying operating conditions and varies the speed at which the electric motor drives the fuel pump in response to the quantity of fuel determined by the electronic engine control to be supplied to the engine under varying operating conditions.

51. A fuel system as defined in claim 26 wherein the electric fuel pump comprises, a centrifugal pump driven by an electric motor at a substantially constant speed.

52. A fuel system as defined in claim 51 which also comprises a one-way valve between the pump outlet and the valve of the demand regulator which permits the flow of fuel from the pump to the demand regulator inlet and closes to prevent reverse flow of fuel from the demand regulator through the fuel pump.

53. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel to the injector(s), a demand regulator inlet carried by the housing for supplying fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve communicating between the demand regulator inlet and the expansible chamber and operably associated with the diaphragm to move to open and closed positions to control the flow of fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel, the fuel pump is a centrifugal pump driven by an electric motor at a substantially constant speed, and a one-way valve between the pump outlet and the valve of the demand regulator which permits the flow of fuel from the pump to the demand regulator inlet and closes to prevent reverse flow of fuel from the demand regulator through the fuel pump and wherein when the valve of the demand regulator closes and the volume of fuel trapped between the injector(s) expands, the diaphragm moves relative to the housing to increase the volume of the expansible chamber to thereby accommodate expansion of the trapped fuel.

54. A fuel system as defined in claim 53 which also comprises a pressure relief valve having an inlet communicating with the pump outlet downstream of the one way valve and upstream of the valve of the demand regulator and an outlet for returning by-passed fuel to the fuel supply and the relief valve being constructed to be normally closed and to open to by-pass the reverse flow of expanded fuel from the demand regulator to the fuel supply at a pressure which is greater than the pressure at which the pump supplies fuel to the demand regulator.

55. A fuel system as defined in claim 26 which also comprises a one-way valve between the pump outlet and the valve of the demand regulator which permits the flow of fuel from the pump to the demand regulator inlet and closes to prevent the reverse flow of fuel from the demand regulator through the fuel pump, a pressure relief valve between the one-way valve and the valve of the demand regulator and which is normally closed and opens at a predetermined pressure greater than the pressure of the fuel supplied to the demand regulator by the fuel pump for returning fuel from the inlet of the demand regulator to the fuel supply, said valve of the demand regulator is yieldably biased toward its closed position, when the valve of the demand regulator closes and the volume of fuel trapped between the injector(s) and the valve of the demand regulator expands, the diaphragm moves relative to the housing to increase the volume of the expansible chamber to accommodate expansion of the trapped fuel, and if the trapped fuel expands sufficiently so that the pressure of the trapped fuel increases to a predetermined pressure greater than the pressure of the fuel at the outlet of the fuel pump, the valve of the demand regulator opens to bleed fuel from the expansible chamber through the demand regulator inlet and the relief valve to the supply of fuel to thereby decrease the pressure of the fuel in the expansible chamber to the predetermined pressure whereupon the valve of the demand regulator closes.

56. A fuel system as defined in claim 18 which also comprises, a one-way valve between the pump outlet and the valve of the demand regulator which permits the flow of fuel from the fuel pump to the demand regulator inlet and closes to prevent the reverse flow of fuel from the demand regulator through the fuel pump, a pressure relief valve between the one-way valve and the valve of the demand regulator and which is normally closed and opens at a predetermined pressure greater than the pressure of the fuel supplied to the demand regulator by the fuel pump for returning fuel from the inlet of the demand regulator to the fuel supply, said valve of the demand regulator is yieldably biased toward its closed position, and when the valve of the demand regulator closes and the volume of fuel trapped between the injector(s) and the valve of the demand regulator expands, the diaphragm moves relative to the housing to increase the volume of the expansible chamber to accommodate expansion of the trapped fuel, and if the trapped fuel expands sufficiently so that the pressure of the trapped fuel increases to a predetermined pressure greater than the pressure of the fuel at the outlet of the fuel pump, the valve of the demand regulator opens to bleed fuel from the expansible chamber through the demand regulator inlet and the relief valve to the supply of fuel to thereby increase the pressure of the fuel in the expansible chamber to the preselected pressure whereupon the valve of the demand regulator closes.

57. A fuel system as defined in claim 1 which also comprises, a one-way valve between the pump outlet and the valve of the demand regulator which permits the flow of fuel from the pump to the demand regulator inlet and closes to prevent the reverse flow of fuel from the demand regulator through the fuel pump, a pressure relief valve between the one-way valve and the valve of the demand regulator and which is normally closed and opens at a predetermined pressure greater than the pressure of the fuel supplied to the demand regulator by the fuel pump for returning fuel from the inlet of the demand regulator to the fuel supply, said valve of the demand regulator is yieldably biased toward its closed position, and when the valve of the demand regulator closes and the volume of fuel trapped between the injector(s) and the valve of the demand regulator expands, the diaphragm moves relative to the housing to increase the volume of the expansible chamber to accommodate expansion of the trapped fuel, and if the trapped fuel expands sufficiently so that the pressure of the trapped fuel increases to a predetermined pressure greater than the pressure of the fuel at the inlet of the demand regulator, the valve of the demand regulator opens to bleed fuel from the expansible chamber through the demand regulator inlet and the relief valve to the supply of fuel to thereby decrease the pressure of the fuel in the expansible chamber to the predetermined pressure whereupon the valve of the demand regulator closes.

58. A fuel system as defined in claim 26 wherein only one side of the diaphragm communicates with the fuel expansible chamber and the demand regulator also comprises a rigid enclosure defining a fluid chamber continuously communicating with only the other side of the diaphragm and a gas sealed in said fluid chamber.

59. A fuel system as defined in claim 26 wherein only one side of the diaphragm communicates with the fuel expansible chamber and the demand regulator also comprises an enclosure defining a fluid chamber continuously communicating with only the other side of the diaphragm, a flexible membrane having a pair of sides with one of its sides communicating with the fluid chamber and its other side communicating with the atmosphere exteriorly of the fluid chamber, and a gas sealed in the fluid chamber, whereby the flexible membrane accommodates expansion and contraction of the gas in the chamber due to changes in the temperature of the gas in the chamber.

60. A fuel system as defined in claim 59 wherein said flexible membrane comprises a bellows carried by said enclosure and received in said fluid chamber, and said enclosure is a rigid enclosure.

61. A fuel system as defined in claim 26 wherein only one side of the diaphragm communicates with the fuel expansible chamber and the demand regulator also comprises a fluid chamber in communication with only the other side of the diaphragm and having a port communicating with the atmosphere exteriorly of the demand regulator.

62. A fuel system as defined in claim 26 wherein only one side of the diaphragm communicates with the fuel expansible chamber and the demand regulator also comprises a fluid chamber in communication with only the other side of the diaphragm and having a port communicating with the fluid chamber, a source of fluid under superatmospheric pressure and a valve movable to a first position to communicate the port with the source to supply superatmospheric pressure to the fluid chamber under some operating conditions of the fuel system and to a second position to interrupt the supply of fluid at superatmospheric pressure to the fluid chamber.

63. A fuel system as defined in claim 26 wherein only one side of the diaphragm communicates with the fuel expansible chamber and the demand regulator also comprises a fluid chamber in communication with the other side of the diaphragm and having a port communicating with the fluid chamber, and the fuel system also comprises a valve movable to a first position to communicate the port with the air intake manifold under some operating conditions of the engine and movable to a second position to communicate the port with the atmosphere under some operating conditions of the fuel system.

64. A fuel system as defined as in claim 26 wherein only side of the diaphragm communicates with the fuel expansible chamber and the demand regulator also comprises a fluid chamber in communication with the other side of the diaphragm and having a port communicating with the fluid chamber, and the fuel system also comprises a source of fluid at superatmospheric pressure and a valve movable to a first position to communicate the port with the exterior atmosphere, to a second position to communicate the port with the air intake manifold of the engine and to a third position to communicate the port with a source of fluid at a superatmospheric pressure.

65. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet from said expansible chamber for communicating with the injector(s) to supply fuel to the injector(s), a demand regulator inlet carried by the housing for supplying fuel to the expansible chamber, an electric fuel pump having a pump inlet for communicating with a supply of fuel and a pump outlet for communicating with the demand regulator inlet to supply fuel thereto at a substantially constant pressure under normal operating conditions a valve communicating between the demand regulator inlet and the expansible chamber and operably associated with the diaphragm to move to open and closed positions to control the flow of fuel from the demand regulator inlet through the expansible chamber, and supplying all the fuel from the expansible chamber to the fuel injector(s) in response to the demand of the engine for fuel under normal operating conditions of the engine to maintain a desired fuel pressure at the injector(s) without a line downstream of the fuel outlet for returning fuel to the supply of fuel, and wherein the diaphragm dampens fuel pressure fluctuation produced by operation of the fuel injector(s) and the demand regulator isolates the components of the fuel system upstream of the demand regulator from the noise produced by these fuel pressure fluctuations from operation of the injector(s).

66. A fuel system as defined in claim 1 which also comprises, a pressure relief valve having an inlet communicating with the pump outlet upstream of the valve of the demand regulator and an outlet for returning by passed fuel to the fuel supply and the relief valve being constructed to by-pass fuel from the pump outlet to maintain the fuel supplied to the demand regulator inlet at a substantially constant pressure.

67. A fuel system as defined in claim 11 which also comprises a pressure relief valve between the one-way valve and the demand regulator and which is normally closed and opens at a predetermined pressure greater than the pressure of the fuel supplied to the regulator by the pump to back bleed fuel from the regulator inlet to the fuel supply.

68. A fuel system as defined in claim 26 wherein only one side of the diaphragm communicates with the fuel expansible chamber and the demand regulator also comprises a fluid chamber in communication with the other side of the diaphragm and having a port communicating with the fluid chamber, and the fuel system also comprises a valve movable to a first position to communicate the port with the air intake manifold and movable to a second position to communicate the port with the atmosphere for starting and running the engine when the temperature of fuel supplied to the injector(s) is greater than a predetermined temperature which is higher than the temperature of the fuel supplied to the injector(s) under normal operating conditions.

69. A fuel system as defined in claim 68 wherein the predetermined fuel temperature is at least 170° F.

70. A no-return fuel system for a combustion engine with an air intake manifold and at least one fuel injector, comprising a demand regulator having a housing, a diaphragm defining in cooperation with said housing an expansible fuel chamber, said diaphragm being yieldably biased relative to the housing in a direction tending to decrease the volume of the expansible chamber, a fuel outlet frown said expansible chamber for communicating with the injector(s) to supply fuel to the injector(s), a demand regulator inlet carried by the housing for supplying all fuel to the expansible chamber, an electric fuel pump having a pump inlet for communicating with a supply of fuel and a pump outlet for communicating with the demand regulator inlet to supply fuel thereto at a substantially constant pressure under normal operating conditions, a valve between the demand regulator inlet and the expansible chamber and operably associated with the diaphragm to move to open and closed positions to control the flow of all fuel from the demand regulator inlet through the expansible chamber, supplying all of the fuel from the expansible chamber to the fuel injector(s) in response to the demand of the engine for fuel under normal operating conditions to maintain a desired fuel pressure at the injector(s) without a line downstream of the fuel outlet of the demand fuel regulator for returning fuel to the supply, and the diaphragm also dampening pressure fluctuation produced by operation of the injector(s) and the demand regulator isolates the components of the fuel system upstream of the demand regulator from noise produced by these pressure fluctuations produced by operation of the injector(s).

71. A fuel system as defined in claim 70 which also comprises at least one fuel rail communicating with a plurality of fuel injectors, said fuel outlet of the said demand regulator communicating with said fuel rail to supply fuel to said plurality of fuel injectors and said demand regulator being carried by said fuel rail.

72. A fuel system as defined in claim 70 which also comprises at least one fuel rail communicating with a plurality of fuel injectors, said fuel outlet of said demand regulator communicating with said fuel rail to supply fuel to said plurality of fuel injectors and said demand regulator being adjacent said fuel rail.

73. A no-return fuel system for a combustion engine with an air intake manifold and at least one fuel injector, comprising a demand regulator having a housing, a diaphragm defining in cooperation with said housing an expansible first chamber and a second chamber, said diaphragm having generally opposed faces with one of the faces communicating with only the first chamber and the other face communicating with only the second chamber, a fuel outlet from said first chamber for communicating with the injector(s) of the engine to supply fuel to the injector(s), a fuel inlet carried by the housing for supplying fuel to the first chamber, an electric pump having a pump inlet for communicating with a supply of fuel and a pump outlet for communicating with the demand regulator inlet to supply fuel thereto at a substantially constant pressure under normal operating conditions, said diaphragm being yieldably biased relative to the housing in a direction tending to decrease the volume of the expansible first chamber, a valve between the demand regulator inlet and the expansible chamber and operably associated with the diaphragm to move to open and closed positions to control the flow of fuel from the demand regulator through the expansible chamber and supplying all of the fuel from the expansible chamber to the fuel injector(s) in response to the demand of the engine for fuel under normal operating conditions to maintain the desired fuel pressure at the injector(s) without a line downstream of the fuel outlet for returning fuel to the supply of fuel, a supply of fluid at a superatmospheric pressure, a port communicating with the second chamber and a valve movable to a first position to communicate the supply of fluid at a superatmospheric pressure with the port to increase the pressure at which the demand regulator supplies fuel to the injector(s).

74. A no-return fuel system as defined in claim 73 in which the valve is movable to a second position to communicate the port with the air intake manifold.

75. A no-return fuel system as defined in claim 73 which also comprises a sensor responsive to the temperature of fuel supplied to the injector(s) to initiate movement of the valve to the first position when the temperature of the fuel supplied to the injector(s) is greater than a predetermined temperature.

\* \* \* \* \*